Patented Nov. 5, 1929

1,734,246

UNITED STATES PATENT OFFICE

HEINZ EICHWEDE, ERICH FISCHER, AND ADOLF SIEGLITZ, OF HOCHST-ON-THE-MAIN, GERMANY, ASSIGNORS TO GENERAL ANILINE WORKS, INC., OF NEW YORK, N. Y., A CORPORATION OF DELAWARE

WATER-SOLUBLE ARYLAZODIARYLAMINE DYESTUFFS AND PROCESS OF MAKING SAME

No Drawing. Application filed August 13, 1927, Serial No. 212,842, and in Germany August 21, 1926.

Our present invention relates to new water-soluble arylazodiarylamine dyestuffs and a process of preparing them.

We have found that valuable arylazodiarylamine dyestuffs of the general formula:

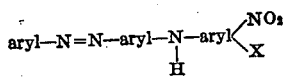

wherein aryl stands for an aryl group of the benzene or naphthalene series which may be substituted or not and X stands for COO-alkali or $SO_2O$-alkali, are obtained by condensing monoaminoazo dyestuffs of the benzene and/or naphthalene series with nitro aryl compounds containing at least one exchangeable nuclear halogen atom and at least one sulfo group or carboxyl group.

The aminoazo dyestuff used in the said process may belong either to the benzene or to the naphthalene series. It may however contain both a benzene nucleus and a naphthalene nucleus, and the amino group, which is acted upon by the condensation with the sulfonated or carboxylated nitrohalogenaryl, may be situated in either the benzene or in the naphthalene nucleus. Furthermore, according to the purpose for which they are to be used and according to the degree of solubility of the finished dyestuffs, the aminoazo dyestuffs used for the condensation may contain one or several solubilizing groups, such as a carboxyl group, a sulfo group or the like or no such group.

The sulfonated or carboxylated nitro aryl compounds containing at least one exchangeable nuclear halogen, applicable in our new process may also belong either to the benzene or naphthalene series. They may, moreover, contain one or several nitro groups or several sulfo groups or carboxyl groups. Besides, sulfo groups and carboxyl groups may be present together. The dyestuffs obtainable by our new process not only dye animal fibers but those that do not contain more than one sulfo group are also particularly suitable for the dyeing of esters and ethers of cellulose and are, moreover, remarkable by the fact that they are not phototrope.

The condensation is in most cases carried out in the presence of boiling water, preferably also in presence of an acid-binding agent, such as sodium acetate, chalk or the like. In those cases in which the halogen can be exchanged only with difficulty, for instance in the mononitrohalogenarylsulfonic acids or mononitrohalogenarylcarboxylic acids, the application of a pressure of about 6–12 atmospheres has proved to be advantageous in our new process.

The following examples serve to illustrate our invention, but they are not intended to limit it thereto, the parts being parts by weight:

1. 197 parts of p-aminoazobenzene and 320,5 parts of potassium 1-chloro-2.6-dinitrobenzene-4-sulfonate are heated for several hours to boiling in water to which 118 parts of crystallized sodium acetate has been added. The dyestuff thus obtained has the following formula:

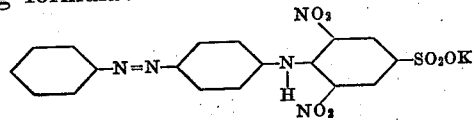

It crystallizes from water as a potassium salt in the form of reddish-yellow crystals and is remarkable for the excellent properties of the dyeings they yield on acetyl cellulose.

2. If molecular proportions of p-aminoazobenzene-monosulfonic acid and potassium 1-chloro-2.6-dinitrobenzene-4-sulfonate are caused to act upon each other in a manner similar to that set forth in Example 1, a dyestuff is obtained which gives on wool intense dyeings, but does not dye acetyl cellulose.

3. If molecular proportions of 1-chloro-2-nitrobenzene-4-sulfonic acid and aminoazo benzol are caused to act upon each other for 6–8 hours at a temperature of about 120° C. in presence of water and 200 parts of chalk, preferably under a pressure of about 6–12 atmospheres, a dyestuff is obtained which dyes animal fibers as well as acetate silk a yellow shade.

When the nitrochlorobenzenesulfonic acids used in Examples 1 to 3 are replaced by nitrohalogenarylcarboxylic acids, dyestuffs of quite similar properties are obtained. Thus, for instance by causing molecular proportions of 1-chloro-2.6-dinitrobenzene-4-carboxylic acid and aminoazobenzene to act upon each other, a brownish-red dyestuff is obtained which dyes wool a reddish-yellow tint and yields on acetate silk an intense golden-yellow dyeing.

We claim:

1. A process for preparing water-soluble arylazodiarylamine dyestuffs, which consists in condensing a monoaminoazo dyestuff the aryl nuclei of which belong to the group consisting of benzene and naphthalene nuclei with nitroaryl compounds containing at least one exchangeable nuclear halogen atom and at least one acid group.

2. A process for preparing water-soluble arylazodiarylamine dyestuffs, which consists in condensing a monoaminoazo dyestuff the aryl nuclei of which belong to the group consisting of benzene and naphthalene nuclei with nitroaryl compounds containing at least one exchangeable nuclear halogen atom and at least one sulfo group.

3. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and an acid-binding agent with nitroaryl compounds containing at least one exchangeable nuclear halogen atom and at least one acid group.

4. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and of an acid-binding agent with nitroaryl compounds containing at least one exchangeable nuclear halogen atom and at least one sulfo group.

5. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and sodium acetate, with nitroaryl compounds containing at least one exchangeable nuclear halogen atom and at least one acid group.

6. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and sodium acetate with nitroaryl compounds containing at least one exchangeable nuclear halogen atom and at least one sulfo group.

7. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and an acid-binding agent and under a pressure of about 6–12 atmospheres, with nitroaryl compounds containing at least one exchangeable nuclear halogen atom and at least one acid group.

8. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and of an acid-binding agent and under a pressure of about 6–12 atmospheres, with nitroaryl compounds containing at least one exchangeable nuclear halogen atom and at least one sulfo group.

9. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and sodium acetate and under a pressure of about 6–12 atmospheres, with nitroaryl compounds containing at least one exchangeable nuclear halogen atom and at least one acid group.

10. A process for preparing water-soluble arylazodiarylamine dyestuffs, which consists in condensing a monoaminoazo dyestuff the aryl nuclei of which belong to the group consisting of benzene and naphthalene nuclei in the presence of boiling water and sodium acetate and under a pressure of about 6–12 atmospheres, with nitroaryl compounds containing at least one exchangeable nuclear halogen atom and at least one sulfo group.

11. A process for preparing water-soluble arylazodiarylamine dyestuffs, which consists in condensing aminoazobenzene in the presence of boiling water and an acid-binding agent with nitroaryl compounds containing at least one exchangeable nuclear halogen atom and at least one acid group.

12. A process for preparing water-soluble arylazodiarylamine dyestuffs, which consists in condensing aminoazobenzene in the presence of boiling water and of an acid-binding agent with nitroaryl compounds containing at least one exchangeable nuclear halogen atom and at least one sulfo group.

13. A process for preparing water-soluble arylazodiarylamine dyestuffs, which consists in condensing aminoazobenzene, in the presence of boiling water and sodium acetate, with nitroaryl compounds containing at least one exchangeable nuclear halogen atom and at least one acid group.

14. A process for preparing water-soluble arylazodiarylamine dyestuffs, which consists in condensing aminoazobenzene, in the presence of boiling water and sodium acetate, with nitroaryl compounds containing at least one exchangeable nuclear halogen atom and at least one sulfo group.

15. A process for preparing a water-soluble arylazodiarylamine dyestuff of the following formula:

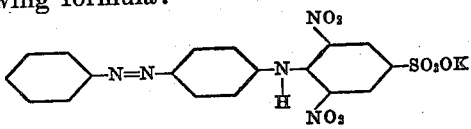

which consists in condensing para-aminoazobenzene with potassium 1-chloro-2.6 dinitrobenzene-4-sulfonate in the presence of boiling water and sodium acetate.

16. As new products, arylazodiarylamine dyestuffs of the following formula:

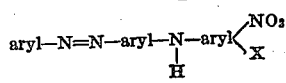

wherein aryl stands for an aryl nucleus of the group consisting of benzene and naphthalene nuclei which may be substituted or not and X stands for COO-alkali or $SO_2O$-alkali, said dyestuffs being water-soluble and yielding intense dyeings which on acetate silk are not phototrope.

17. As new products, arylazodiarylamine dyestuffs of the following formula:

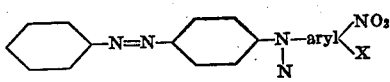

wherein aryl stands for an aryl nucleus of the group consisting of benzene and naphthalene nuclei which may be substituted or not and X stands for COO-alkali or $SO_2O$-alkali, said dyestuffs being soluble in water and giving intense dyeings which on acetate silk are not phototrope.

18. As a new product, the dyestuff of the following formula:

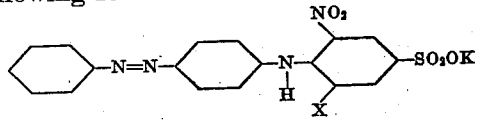

wherein X stands for hydrogen or a nitro group, said dyestuff being soluble in water and dyeing wool and acetyl cellulose yellow tint and its dyeing on acetate silk being non-phototrope.

19. As a new product, the dyestuff of the following formula:

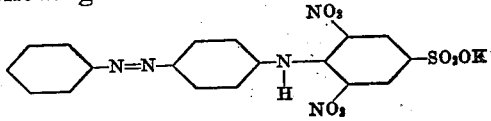

said dyestuff being soluble in water, crystallizing from water as reddish-yellow crystals and being distinguished by the excellent properties of its dyeings on acetyl cellulose and its dyeing on acetate silk being non-phototrope.

In testimony whereof, we affix our signatures.

HEINZ EICHWEDE.
ERICH FISCHER.
ADOLF SIEGLITZ.

Certificate of Correction

Patent No. 1,734,246. Granted November 5, 1929, to

HEINZ EICHWEDE ET AL.

It is hereby certified that error appears in the printed specification of the above-numbered patent requiring correction as follows: Page 3, line 30, strike out the formula and insert instead

and that the said Letters Patent should be read with this correction therein that the same may conform to the record of the case in the Patent Office.

Signed and sealed this 5th day of December, A. D. 1929.

[SEAL]

M. J. MOORE,
*Acting Commissioner of Patents*